(12) United States Patent
Judkins et al.

(10) Patent No.: US 9,397,611 B2
(45) Date of Patent: Jul. 19, 2016

(54) PHOTOVOLTAIC SYSTEMS WITH LOCAL MAXIMUM POWER POINT TRACKING PREVENTION AND METHODS FOR OPERATING SAME

(75) Inventors: Zachary S. Judkins, Berkeley, CA (US); Keith Johnston, Palo Alto, CA (US)

(73) Assignee: SunPower Corporation, San Jose, CA (US)

( * ) Notice: Subject to any disclaimer, the term of this patent is extended or adjusted under 35 U.S.C. 154(b) by 1077 days.

(21) Appl. No.: 13/431,854

(22) Filed: Mar. 27, 2012

(65) Prior Publication Data
US 2013/0257155 A1    Oct. 3, 2013

(51) Int. Cl.
H02J 1/10 (2006.01)
H01L 31/042 (2014.01)
G01R 31/40 (2014.01)
H02J 3/38 (2006.01)

(52) U.S. Cl.
CPC ............... H02S 50/00 (2013.01); *H02J 3/385* (2013.01); *Y02E 10/50* (2013.01); *Y10T 307/50* (2015.04)

(58) Field of Classification Search
USPC ............ 307/43, 39, 18, 19, 20; 136/244, 246; 700/275, 297
See application file for complete search history.

(56) References Cited

U.S. PATENT DOCUMENTS

| | | | |
|---|---|---|---|
| 4,153,474 A | 5/1979 | Rex | |
| 4,323,719 A | 4/1982 | Green | |
| 4,373,783 A | 2/1983 | Anderson | |
| 4,456,332 A | 6/1984 | Anderson | |
| 4,468,848 A | 9/1984 | Anderson et al. | |
| 4,468,849 A | 9/1984 | Anderson et al. | |
| 4,481,378 A | 11/1984 | Lesk | |
| 4,502,200 A | 3/1985 | Anderson et al. | |
| 4,640,734 A | 2/1987 | Roberts et al. | |
| 4,643,543 A | 2/1987 | Mohn et al. | |
| 4,643,544 A | 2/1987 | Loughran | |
| 4,759,803 A | 7/1988 | Cohen | |
| 5,180,441 A | 1/1993 | Cornwall et al. | |
| 5,248,346 A | 9/1993 | Fraas et al. | |
| 5,334,496 A | 8/1994 | Pond et al. | |
| 5,344,496 A | 9/1994 | Stern et al. | |
| 5,389,158 A | 2/1995 | Fraas et al. | |

(Continued)

FOREIGN PATENT DOCUMENTS

| | | |
|---|---|---|
| DE | 10041271 | 3/2002 |
| DE | 202004005198 | 8/2004 |

(Continued)

OTHER PUBLICATIONS

Bardwell, Karen et al., "Minimizing End Shadowing Effects on Parabolic Concentrator Arrays," IEEE, 1980, pp. 765-770.

(Continued)

*Primary Examiner* — Hal Kaplan
(74) *Attorney, Agent, or Firm* — Okamoto & Benedicto LLP (57) ABSTRACT

A photovoltaic system includes solar cells and an inverter configured to convert direct current generated by the solar cells to alternating current. The photovoltaic system includes a maximum power point (MPP) tracking module configured to perform MPP tracking for the photovoltaic system. The MPP tracking module is configured to detect shading of the solar cells and to modify its MPP tracking to prevent tracking of local MPPs. The MPP tracking module may be incorporated in the inverter.

19 Claims, 7 Drawing Sheets

(56) References Cited

U.S. PATENT DOCUMENTS

| | | | |
|---|---|---|---|
| 5,409,549 A | 4/1995 | Mori | |
| 5,498,297 A | 3/1996 | O'Neill et al. | |
| 5,580,395 A | 12/1996 | Yoshioka et al. | |
| 5,616,185 A | 4/1997 | Kukulka | |
| 5,660,644 A | 8/1997 | Clemens | |
| 5,697,192 A | 12/1997 | Inoue | |
| 5,865,905 A | 2/1999 | Clemens | |
| 5,899,199 A | 5/1999 | Mills | |
| 5,990,415 A | 11/1999 | Green et al. | |
| 6,034,322 A | 3/2000 | Pollard | |
| 6,131,565 A | 10/2000 | Mills | |
| 6,323,478 B1 | 11/2001 | Fujisaki et al. | |
| 6,359,209 B1 | 3/2002 | Glenn et al. | |
| 6,442,937 B1 | 9/2002 | Stone | |
| 6,465,725 B1* | 10/2002 | Shibata et al. | 136/246 |
| 6,553,729 B1 | 4/2003 | Nath et al. | |
| 6,635,507 B1 | 10/2003 | Boutros et al. | |
| 7,468,485 B1 | 12/2008 | Swanson | |
| 7,554,031 B2 | 6/2009 | Swanson et al. | |
| 7,709,730 B2 | 5/2010 | Johnson et al. | |
| 7,820,906 B2 | 10/2010 | Johnson et al. | |
| 7,825,327 B2 | 11/2010 | Johnson et al. | |
| 7,932,461 B2 | 4/2011 | Johnson et al. | |
| 7,952,057 B2 | 5/2011 | Finot et al. | |
| 7,968,791 B2 | 6/2011 | Do et al. | |
| 8,039,777 B2 | 10/2011 | Lance et al. | |
| 8,049,150 B2 | 11/2011 | Johnson et al. | |
| 8,071,930 B2 | 12/2011 | Wylie et al. | |
| 8,076,625 B2* | 12/2011 | McDonald | 250/203.4 |
| 8,083,362 B2 | 12/2011 | Finot et al. | |
| 8,630,293 B2* | 1/2014 | Cohen et al. | 370/392 |
| 8,754,627 B1* | 6/2014 | Le | 323/299 |
| 2004/0074490 A1 | 4/2004 | Mills et al. | |
| 2007/0151598 A1 | 7/2007 | De Ceuster et al. | |
| 2007/0257274 A1 | 11/2007 | Martter et al. | |
| 2008/0035198 A1 | 2/2008 | Teppe et al. | |
| 2008/0236648 A1* | 10/2008 | Klein et al. | 136/244 |
| 2008/0238195 A1* | 10/2008 | Shaver et al. | 307/18 |
| 2009/0056699 A1 | 3/2009 | Mills et al. | |
| 2009/0056785 A1 | 3/2009 | Johnson et al. | |
| 2009/0056786 A1 | 3/2009 | Johnson et al. | |
| 2009/0056787 A1 | 3/2009 | Johnson et al. | |
| 2009/0095284 A1 | 4/2009 | Klotz | |
| 2009/0139557 A1 | 6/2009 | Rose et al. | |
| 2009/0151778 A1* | 6/2009 | Wang | 136/252 |
| 2009/0159113 A1* | 6/2009 | Morimoto | 136/244 |
| 2009/0188487 A1* | 7/2009 | Jones et al. | 126/600 |
| 2009/0188488 A1* | 7/2009 | Kraft et al. | 126/601 |
| 2009/0284998 A1* | 11/2009 | Zhang et al. | 363/55 |
| 2010/0006140 A1* | 1/2010 | Parker et al. | 136/246 |
| 2010/0071742 A1* | 3/2010 | de Rooij et al. | 136/244 |
| 2010/0108860 A1* | 5/2010 | Sherman et al. | 250/203.4 |
| 2010/0117623 A1* | 5/2010 | Fife et al. | 324/76.11 |
| 2010/0154788 A1 | 6/2010 | Wells et al. | |
| 2010/0163014 A1 | 7/2010 | Johnson et al. | |
| 2010/0175740 A1 | 7/2010 | Johnson et al. | |
| 2010/0175741 A1* | 7/2010 | Thorne | 136/251 |
| 2010/0193014 A1 | 8/2010 | Johnson et al. | |
| 2010/0212653 A1* | 8/2010 | McDonald | 126/573 |
| 2010/0213761 A1* | 8/2010 | McDonald et al. | 307/18 |
| 2010/0236626 A1 | 9/2010 | Finot et al. | |
| 2010/0237703 A1* | 9/2010 | Stern | 307/77 |
| 2010/0294336 A1 | 11/2010 | Johnson et al. | |
| 2010/0294337 A1* | 11/2010 | Sherman et al. | 136/246 |
| 2010/0319682 A1 | 12/2010 | Klotz | |
| 2011/0012430 A1* | 1/2011 | Cheng et al. | 307/82 |
| 2011/0023940 A1 | 2/2011 | Do et al. | |
| 2011/0130889 A1* | 6/2011 | Khajehoddin et al. | 700/298 |
| 2011/0132457 A1 | 6/2011 | Finot | |
| 2011/0186130 A1 | 8/2011 | Finot et al. | |
| 2011/0187198 A1* | 8/2011 | Williams et al. | 307/71 |
| 2011/0198935 A1* | 8/2011 | Hinman et al. | 307/80 |
| 2011/0224831 A1* | 9/2011 | Beardsworth et al. | 700/275 |
| 2011/0226309 A1 | 9/2011 | Do et al. | |
| 2011/0226310 A1 | 9/2011 | Johnson et al. | |
| 2011/0265869 A1 | 11/2011 | Finot et al. | |
| 2012/0048341 A1* | 3/2012 | Mikhael et al. | 136/246 |
| 2012/0072041 A1* | 3/2012 | Miller et al. | 700/292 |
| 2012/0075898 A1* | 3/2012 | Sigamani et al. | 363/131 |
| 2012/0126624 A1* | 5/2012 | Hester et al. | 307/77 |
| 2012/0158362 A1* | 6/2012 | Vandevelde et al. | 702/183 |
| 2012/0193512 A1* | 8/2012 | Wu et al. | 250/203.4 |
| 2013/0077366 A1* | 3/2013 | Kim et al. | 363/95 |
| 2013/0342017 A1* | 12/2013 | Lipan | 307/43 |

FOREIGN PATENT DOCUMENTS

| | | |
|---|---|---|
| GB | 2340993 | 3/2000 |
| JP | 2007184542 | 7/2007 |
| JP | 2007194521 | 8/2007 |
| JP | 2007214247 | 8/2007 |
| KR | 1020070070183 | 7/2007 |
| KR | 1020090014153 | 2/2009 |
| WO | WO9957493 | 11/1999 |
| WO | WO2007096157 | 8/2007 |
| WO | WO2007096158 | 8/2007 |
| WO | WO2008022409 | 2/2008 |
| WO | WO2008153922 | 12/2008 |
| WO | WO2009023063 | 2/2009 |
| WO | WO2009029275 | 3/2009 |
| WO | WO2009029277 | 3/2009 |

OTHER PUBLICATIONS

Carroll, Don et al. "Production of the Alpha Solarco Proof-of-Concept Array," IEEE, 1990, pp. 1136-1141.

Edenburn, Michael W., et al. "Shading Analysis of a Photovoltaic Cell String Illuminated by a Parabolic Trough Concentrator," IEEE, 1981, pp. 63-68.

Quagan, Robert J., "Laser Diode Heat Spreaders," Ion Beam Milling, Inc., website copyright 2010, http://www.ionbeammilling.com/default.asp, 9 pgs.

Shepard, Jr., N. F. et al., "The Integration of Bypass Diodes with Terrestrial Photovoltaic Modules and Arrays," IEEE, 1984, pp. 676-681.

Stern, T. G., "Interim results of the SLATS concentrator experiment on LIPS-II (space vehicle power plants)," Photovoltaic Specialists Conference, 1988., Conference Record of the Twentieth IEEE , vol., No., pp. 837-840 vol. 2, 1988. URL: http://ieeexplore.ieee.org/stamp/stamp.jsp?tp=&arnumber=105822&isnumber=3239.

Vivar Garcia, Marta, "Optimisation of the Euclides Photovoltaic Concentrator," 2009, 390 pages.

PCT International Search Report and Written Opinion of the International Searching Authority for Application No. PCT/US2012/068986, Feb. 26, 2013, 8 sheets.

\* cited by examiner

PHOTOVOLTAIC SYSTEMS WITH LOCAL MAXIMUM POWER POINT TRACKING PREVENTION AND METHODS FOR OPERATING SAME

TECHNICAL FIELD

Embodiments of the subject matter described herein relate generally to solar cells. More particularly, embodiments of the subject matter relate to maximum power point tracking for photovoltaic systems.

BACKGROUND

A photovoltaic system comprises a plurality of solar cells and one or more photovoltaic inverters. Solar cells are well known devices for converting solar radiation to electrical energy. An inverter converts direct current (DC) generated by the solar cells to alternating current (AC).

Photovoltaic systems can operate at any voltage between short-circuit voltage where the voltage is zero and open-circuit voltage where the voltage is at the maximum that can be generated by the photovoltaic system. There is an associated current with each point of voltage operation. In order to maximize the output power of the photovoltaic system, the optimal current and voltage operating points must be located. The operating point where the output power of the photovoltaic system is at its maximum is known as the "maximum power point" (MPP). The voltage and current of the photovoltaic system at the MPP is the maximum power voltage (Vmp) and the maximum power current (Imp), respectively.

Figure 1:
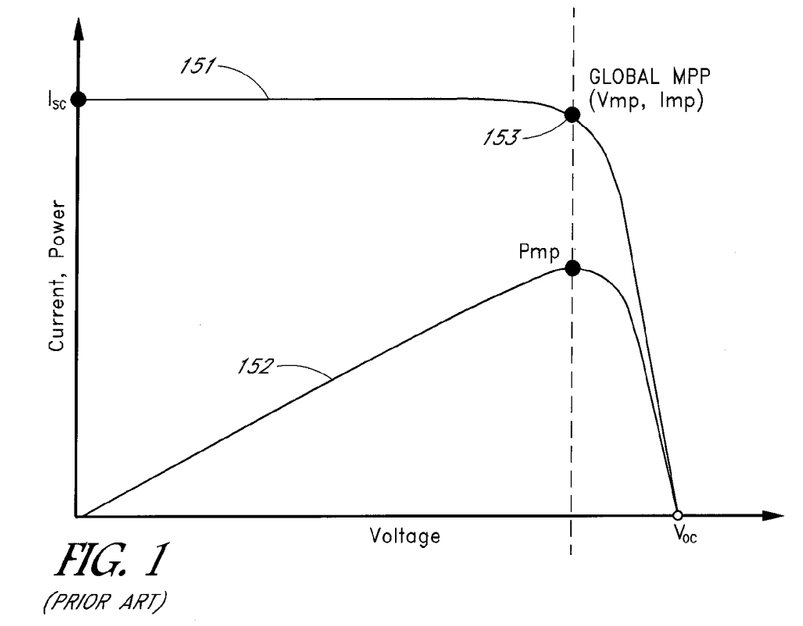
FIG. 1 shows a current-voltage (I-V) curve of an example photovoltaic system.

FIG. 1 shows a current-voltage (I-V) curve 151 of an example photovoltaic system. Superimposed on the I-V curve 151 is a corresponding power-voltage curve 152 of the photovoltaic system. At the MPP (see 153), the photovoltaic system outputs a maximum power current Imp and a maximum power voltage Vmp. The output power of the photovoltaic system at the MPP is the maximum power Pmp, which is the product of Vmp and Imp. It is to be noted that the open circuit voltage Voc occurs when the system current is zero, and the short circuit current Isc occurs when the system voltage is zero.

Photovoltaic systems perform MPP tracking to maintain their outputs at the MPP. Example methods of MMP tracking include the "perturb and observe" (P&O) method and the "incremental conductance" (IncC) method. In the P&O method, the voltage or current of the photovoltaic system is perturbed by a small step size to detect a corresponding change in power. If the power increases, the perturbing continues in the same direction; if the power decreases, the perturbing is changed to the opposite direction. As its name implies, the incremental conductance method utilizes the incremental conductance (dI/dV) of the photovoltaic system to compute the sign of the change in power with respect to voltage (dP/dV) to track the maximum power point.

BRIEF SUMMARY

In one embodiment, a method of operating a photovoltaic system includes receiving a reading of a voltage and a current generated by a plurality of solar cells. A condition that indicates shading of a group of solar cells in the plurality of solar cells is detected. In response to detecting the condition that indicates shading of the group of solar cells, maximum power point tracking of the photovoltaic system is modified to generate a setpoint voltage. The plurality of solar cells generates the voltage in accordance with the MPP tracking setpoint voltage.

In another embodiment, a photovoltaic system comprises a plurality of solar cells, a solar tracker configured to position, a first photovoltaic module comprising a first group of solar cells in a plurality of solar cells, the solar tracker including a motor for adjusting the position of the first photovoltaic module, an inverter configured to receive a voltage and a current of the plurality of solar cells, and a maximum power point tracking module configured to detect when the first photovoltaic module shades a second photovoltaic module that comprises a second group of solar cells in the plurality of solar cells.

In another embodiment, a method of operating a photovoltaic system includes performing maximum power point tracking to generate a voltage setpoint that is decremented by a first decrement step size. A plurality of solar cells generates a voltage in accordance with the voltage setpoint. The first decrement step size is increased to a second decrement step size upon occurrence of a time instance, the second decrement step size being larger than the first decrement step size. Maximum power point tracking is performed to decrement the voltage setpoint by the second decrement step size. After the voltage setpoint is decremented by the second step size, the plurality of solar cells generates the voltage in accordance with the voltage setpoint.

These and other features of the present invention will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Generally speaking, currently available MPP tracking methods operate well under normal operating conditions where the photovoltaic system is fully illuminated. However, there are certain operating conditions where MPP tracking methods break down. In particular, some MPP tracking methods get stuck tracking local MPPs, which are local maxima on the power-voltage curves. Local MPPs have similar qualities to the true MPP but do not represent the true maximum power of the photovoltaic system. The true MPP is also referred to as the "global MPP" because it is the MPP for the entire I-V curve of the photovoltaic system. In contrast, a local maximum power point is an MPP only for a section of the I-V curve.

Figure 2:
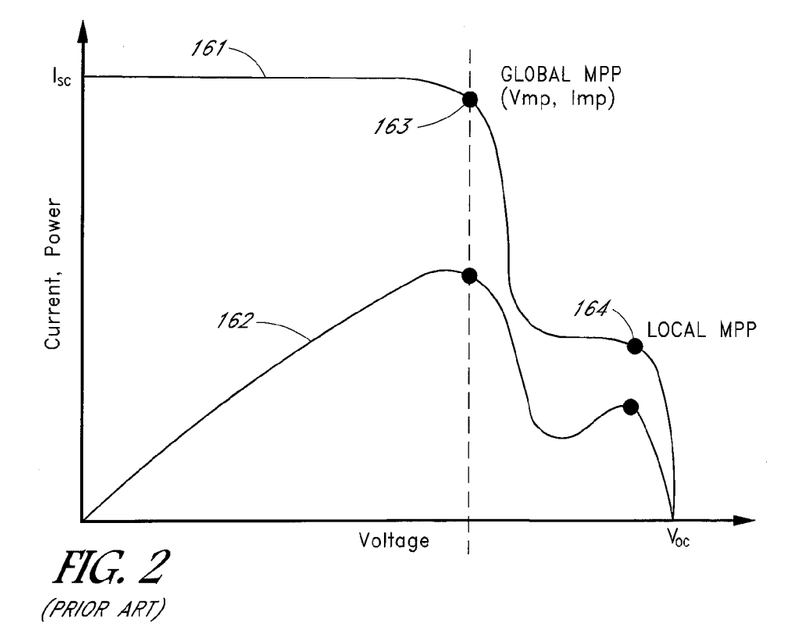
FIG. 2 shows an example I-V curve of a photovoltaic system including local and global MPPs.

The I-V curve 151 of FIG. 1 is a result of normal operating conditions where there is only a single MPP 153, which is a global MPP, on the curve 151. In other operating conditions, however, there may be one or more local MPPs on the I-V curve in addition to the global MPP. FIG. 2 shows an example I-V curve 161 of a photovoltaic system, and corresponding power-voltage curve 162. In the example of FIG. 2, the I-V curve 161 includes a local MPP 164 in addition to the global MPP 163. As is evident from the power-voltage curve 162, the local MPP 164 is not the operating point where the photovoltaic system outputs maximum power; the photovoltaic system outputs maximum power at the global MPP 163.

Figure 3:
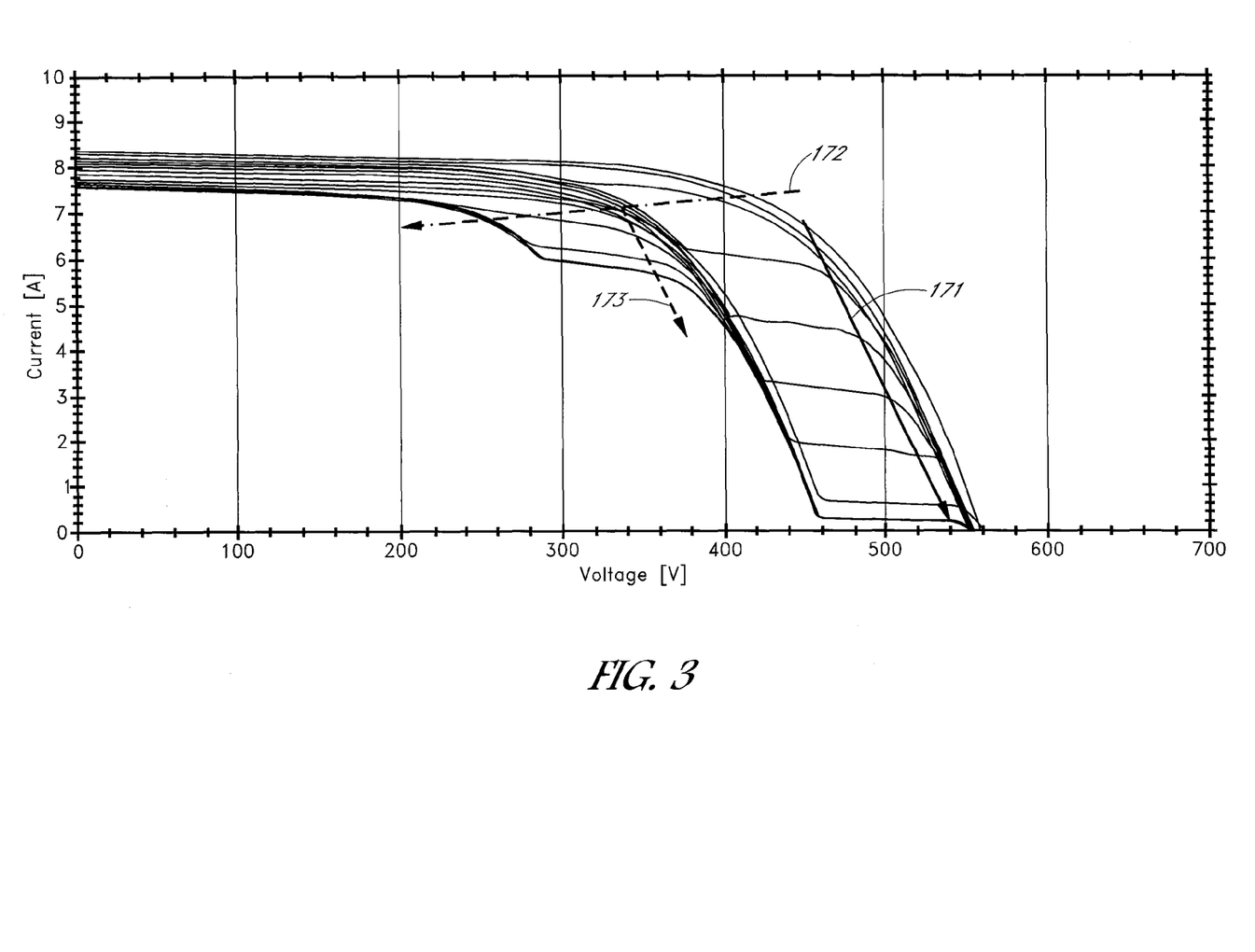
FIG. 3 shows I-V curves of a photovoltaic system in a study performed by the inventors.

In the most basic implementations of the P&O and IncC methods, there is no way to check if a local MPP is being tracked while the maximum power voltage Vmp is increasing and the power is decreasing, such as when photovoltaic module shading is increasing at the end of the day. The inventors believe that a problem with both of these aforementioned methods is that as local MPPs form, they emanate from the same voltage point as the global MPP. This phenomenon is illustrated in FIG. 3, which shows I-V curves of a photovoltaic system in a study performed by the inventors. In the example of FIG. 3, the direction of increasing voltage and decreasing current indicated by the arrow 171 follows a local MPP, while the direction indicated by the arrow 172 follows the preferred global MPP at a lower voltage. The arrow 173 generally indicates the local MPPs emanating from the same voltage as the global MPPs. At first, the voltage spacing between the local and global MPPs is very small. If in the process of normal MPP tracking a voltage increment step takes the power point to the high voltage side of the local MPP, there is a high probability that these methods will not be able to recover to the global MPP. Once a local MPP is located and tracked, it is very difficult to identify if another MPP exists.

Another challenge in distinguishing between the global and local MPPs is that an MPP tracking method typically only focuses on a small window of the I-V curve. This is a consequence of a small voltage step size, which is desirable to maximize the operating power at all times and to minimize the voltage dithering range. The tradeoff is that the MPP tracking method does not capture any large scale changes in the I-V curve, such as when a local MPP is introduced.

The inventors determined that local MPPs may be induced by photovoltaic module shading and corresponding bypass diode responses. That is, MPP tracking may follow a local MPP, rather than a global MPP, when some of the solar cells are shaded. As will be more apparent below, embodiments of the present invention, among other features, may detect conditions indicative of solar cell shading and, in response, modify the MPP tracking to prevent tracking of local MPPs. Embodiments of the present invention may also prevent tracking of local MPPs by changing the decrement size employed in the MPP tracking under certain temporal conditions.

Figure 4:
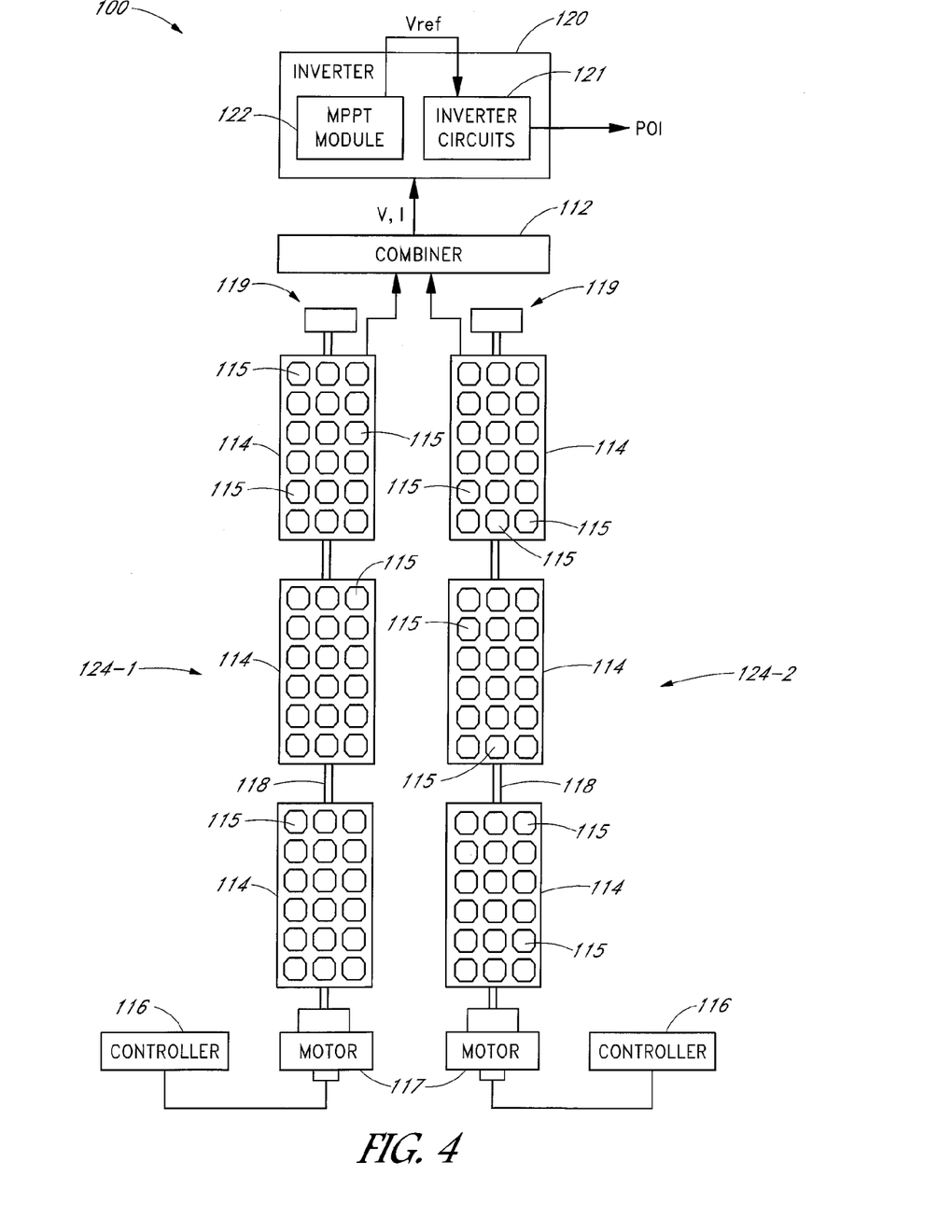
FIG. 4 shows a schematic diagram of a photovoltaic system in accordance with an embodiment of the present invention.

Referring now to FIG. 4, there is shown a schematic diagram of a photovoltaic system 100 in accordance with an embodiment of the present invention. In the example of FIG. 4, the photovoltaic system 100 includes a photovoltaic inverter 120 and a plurality of solar cells 115. The solar cells 115 convert solar radiation into electrical energy. The solar cells 115 may be commercially available solar cells, such as those available from the SunPower™ Corporation of San Jose, Calif., for example. In the example of FIG. 4, a group of solar cells 115 is mounted on a photovoltaic module 114. The solar cells 115 may also be mounted or packaged differently without detracting from the merits of the present invention.

A string 124 (i.e., 124-1, 124-2) of photovoltaic modules 114 may be mounted on a solar tracker 119. Two strings 124 are shown for illustration, but the photovoltaic system 100 may have one or more strings 124. A string 124 may comprise solar cells 115 that are electrically connected in series.

A solar tracker 119 may comprise a torque tube 118, a motor 117, and a solar tracker controller 116. The torque tube 118 may comprise a rigid tube or other support onto which the photovoltaic modules 114 are attached. A motor 117 rotates the torque tube 118 to rotate the photovoltaic modules 114. A solar tracker controller 116 may be configured to drive the motor 117 to orient the photovoltaic modules 114 towards the sun for optimum solar illumination. A solar tracker controller 116 may position the photovoltaic modules 114 based on the date and time. A solar tracker controller 116 may communicate with the inverter 120 and/or other device configured for MPP tracking by wired or wireless communication. In one embodiment, a solar tracker controller 116 is configured to provide the inverter 120 position information that is indicative of the orientation of the solar cells 115 relative to solar illumination. The position information may comprise a reading of a rotational position of a motor 117 or motor setpoint of the motor 117, for example.

A combiner box 112 provides junctions where the outputs of the solar cells 115 may be combined and/or connected to other components. In the example of FIG. 4, the combiner box 112 provides the combined voltage (V) and combined current (I) generated by the solar cells 115 to the inverter 120.

The inverter 120 converts direct current (DC) generated by the solar cells 115 to alternating current (AC). The photovoltaic system 100 may have a plurality of inverters 120 but only one is shown in FIG. 4 for clarity of illustration. In the example of FIG. 4, the inverter 120 comprises inverter circuits 121 and an MPP tracking module 122. The inverter circuits 121 may comprise electrical circuits for converting DC from the solar cells 115 to AC suitable for delivery to a point of interconnection (POI), such a utility meter or connection to a utility grid, for example. The inverter circuits 121 may employ electrical circuits employed by commercially available photovoltaic inverters.

The MPP tracking module 122 may comprise control logic for performing MPP tracking. The MPP tracking module 122 may be implemented in software (e.g., computer-readable program code stored in memory and executed by a processor), hardware (e.g., ASIC, hardwired logic), or combination of hardware and software (e.g., firmware). The MPP tracking module 122 may be configured to perform a normal MPP tracking method, which is so named because it is configured to perform MPP tracking under normal operating conditions. The normal MPP tracking method may comprise the P&O or IncC method, for example. The MPP tracking module 112 may be configured to modify the normal MPP tracking method in response to detecting shading of the solar cells 115 and/or when certain temporal conditions are met. The modification may involve use of another MPP tracking method instead of the normal MPP tracking method, changing a value of a variable (e.g., increment step size or decrement step size) of the normal MPP tracking method, performing a full I-V curve sweep, and/or other ways of changing the processing behavior, and accordingly the output, of the normal MPP tracking method. The MPP tracking module 122 may be configured to receive from a solar tracker controller 116 position information indicative of orientation of the solar cells 115 relative to solar illumination.

In the example of FIG. 4, the MPP tracking module 122 is implemented in the inverter 120. The MPP tracking module 122 reads the voltage and current of the solar cells 115, performs MPP tracking using the voltage and current levels of the solar cells 115 to determine a voltage setpoint in the form of a voltage reference Vref, and provides the voltage reference Vref to the inverter circuits 121. The inverter circuits 121 change the impedance presented to the solar cells 115, or perform other actions depending on the inverter, to induce the solar cells 115 to generate a voltage at a same level as the reference voltage Vref. It is to be noted that the reference voltage Vref serves as a setpoint, but the actual voltage operating point of the photovoltaic system may differ from the reference voltage Vref. As can be appreciated, the functionality of the MPP tracking module 122 may also be implemented in a device other than a photovoltaic inverter.

Figure 5:
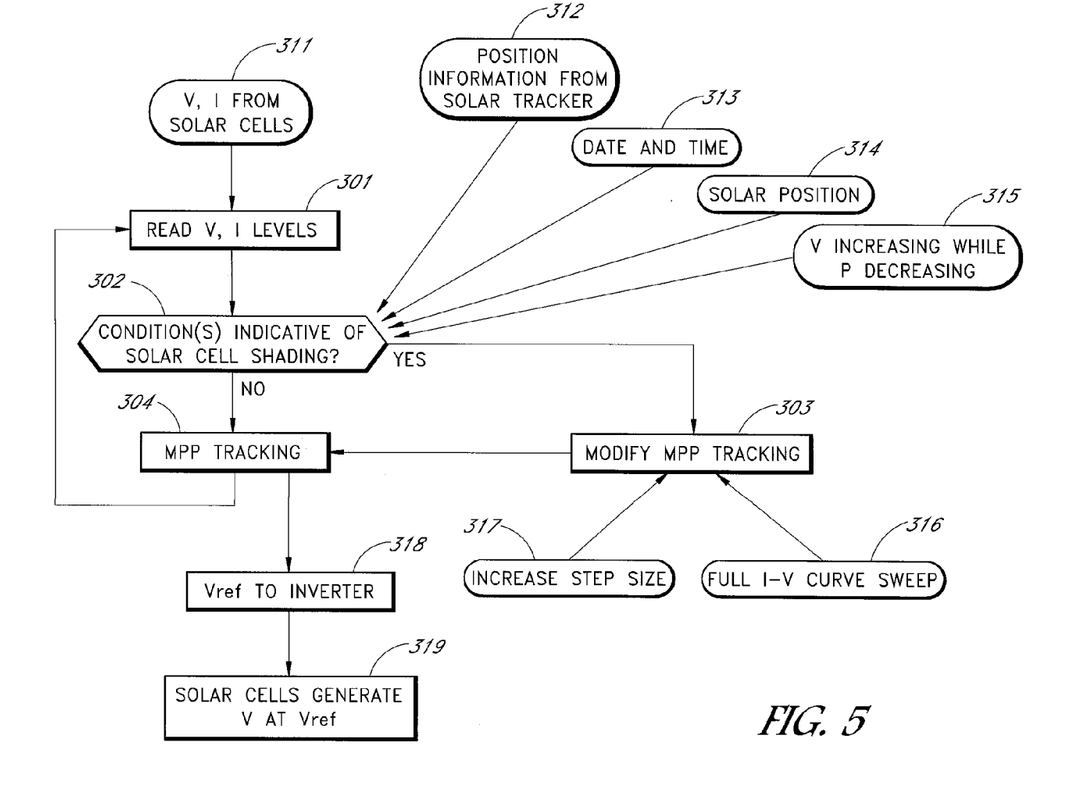
FIG. 5 shows a flow diagram of a method of operating a photovoltaic system in accordance with an embodiment of the present invention.

FIG. 5 shows a flow diagram of a method of operating a photovoltaic system in accordance with an embodiment of the present invention. The method of FIG. 5 is explained using the components of the photovoltaic system 100 for illustration purposes only. Other components may also be employed without detracting from the merits of the present invention.

In the example of FIG. 5, the inverter 120 receives the voltage and current generated by the solar cells 115 (input 311). The MPP tracking module 122 reads the voltage and current levels of the solar cells 115 (step 301), e.g., from a voltage/current meter of the inverter 120. The MPP tracking module 122 may calculate the output power of the solar cells 115 from their voltage and current.

Before performing MPP tracking using the read voltage and current of the solar cells 115, the MPP tracking module 122 detects for one or more conditions indicative of shading of the solar cells 115 (step 302). In one embodiment, the conditions indicative of shading of solar cells 115 include a condition when a photovoltaic module 114 may cast a shadow on another photovoltaic module 114. This example of shading of solar cells 115 is illustrated in FIG. 6.

Figure 6:
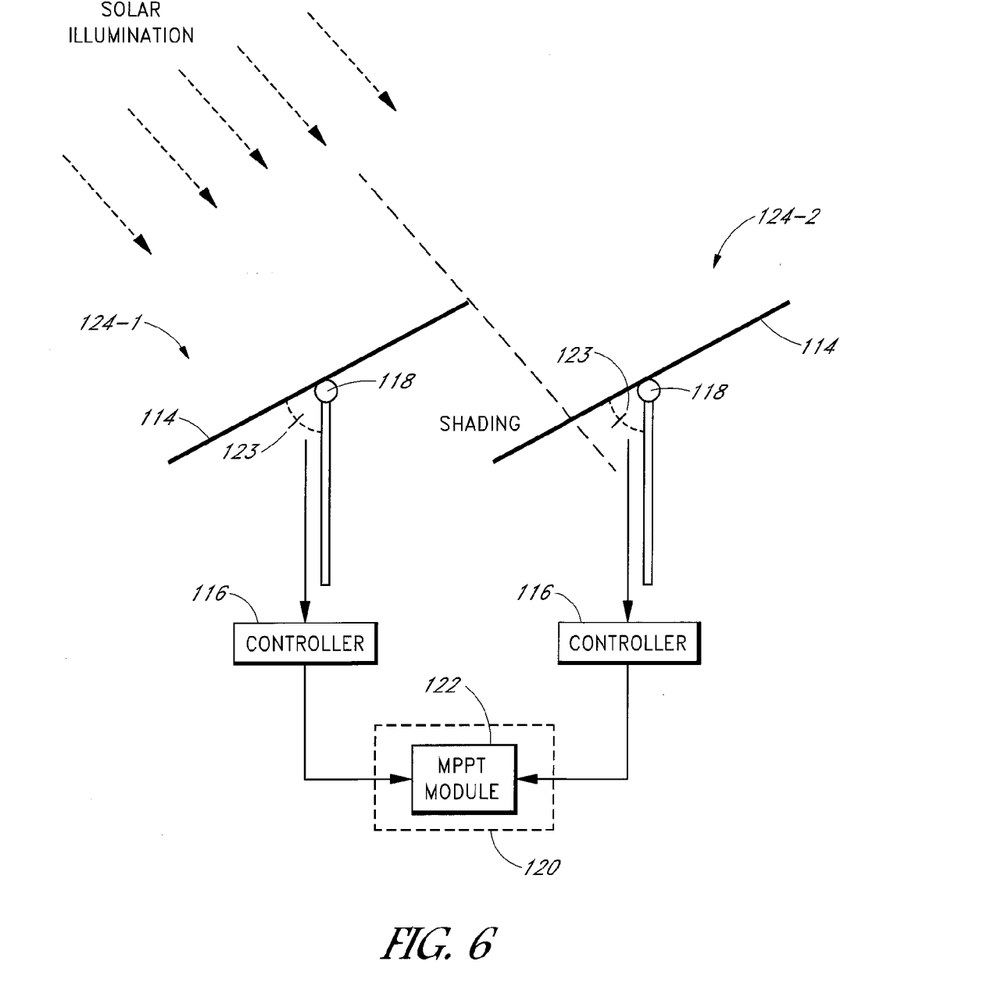
FIG. 6 shows a schematic diagram illustrating detection of one or more conditions indicative of shading of solar cells in accordance with an embodiment of the present invention.

FIG. 6 shows a schematic diagram illustrating detection of one or more conditions indicative of shading of the solar cells 115 in accordance with an embodiment of the present invention. In the example of FIG. 6, solar illumination from the sun is coming from the left side, resulting in the photovoltaic module 114 of the string 124-1 shading, i.e., casting a shadow on, a photovoltaic module 114 of the string 124-2. The shading of the photovoltaic module 114 of the string 124-2 is partial shading because only some, and not all, of the solar cells 115 of the photovoltaic module 114 are shaded. The inventors determined that shading of this nature may be predicted based on system design and location. In other words, the shading typically occurs during a particular orientation of the solar cells 115 relative to solar illumination. For example, for a particular installation (e.g., power plant utilizing a photovoltaic system), the shading occurs when the photovoltaic modules 114 are at an angle 123 relative to a line that is perpendicular to ground. More particularly, the shading occurs at a particular motor setpoint of a motor 117. The rotational angle of the motor 117 may be derived from the motor setpoint. The motor setpoint is a command to the motor 117 to rotate a particular angle to position the supported photovoltaic module 114 and thus the corresponding solar cells 115. A solar tracker controller 116 may provide the motor setpoint to the MPP tracking module 122 as solar tracker position information. The solar tracker information may also comprise rotational angle of a motor 117 from an encoder of the motor 117.

Continuing with FIG. 5, the MPP tracking module 122 receives position information from the solar trackers 119 (input 312), such as from the controllers 116 of the solar trackers 119. The position information may indicate the motor setpoints of the motors 117, values of encoders of the motors 117, or other information indicating position of the photovoltaic modules 114. When the position information indicates that shading of the solar cells occurs or will likely occur, the MPP tracking module 122 modifies its normal MPP tracking method to prevent tracking of a local MPP due to the shading (step 303).

The conditions indicative of shading of solar cells 115 may also include a particular date and time (input 313) and calculation on when shading will occur based on solar position (input 314). From historical data of a particular installation, the shading of a group of solar cells 115, such as in FIG. 6, may occur during a particular time of day or date and time. As a particular example, shading of the solar cells 115 in a particular installation may typically occur between 15:00 hours and 17:00 hours. In that case, the MPP tracking module 122 may deem that a condition indicative of solar cell shading is detected when the time of day is between the aforementioned hours.

The time period when shading will occur may also be calculated based on solar position (i.e., location of the sun) and information from a sun tracking algorithm. As a particular example, the MPP tracking module 122 may calculate solar position from the rotation angle of a motor 117. When the solar position indicates that that shading of the solar cells 115 occurs or will occur, the MPP tracking module 122 may deem that a condition indicative of solar cell shading is detected.

The conditions indicative of shading of solar cells 115 may also include a trend where the voltage of the solar cells 115 is increasing while their output power is decreasing (input 315). In one embodiment, the MPP tracking module 122 is configured to monitor the trends of the voltage, current, and power of the solar cells 115 during MPP tracking. The MPP tracking module 122 is configured to detect a trend where the voltage of the solar cells 115 increases while the output power of the solar cells 115 decreases. The inventors believe that there is no operating condition that increases the voltage increase while the power decreases other than tracking of a local MPP. Accordingly, in one embodiment, the MPP tracking module 122 deems that a condition indicative of shading of the solar cells 115 is detected when the voltage of the solar cells 115 is increasing while the output power of the solar cells 115 is decreasing.

Figure 7:
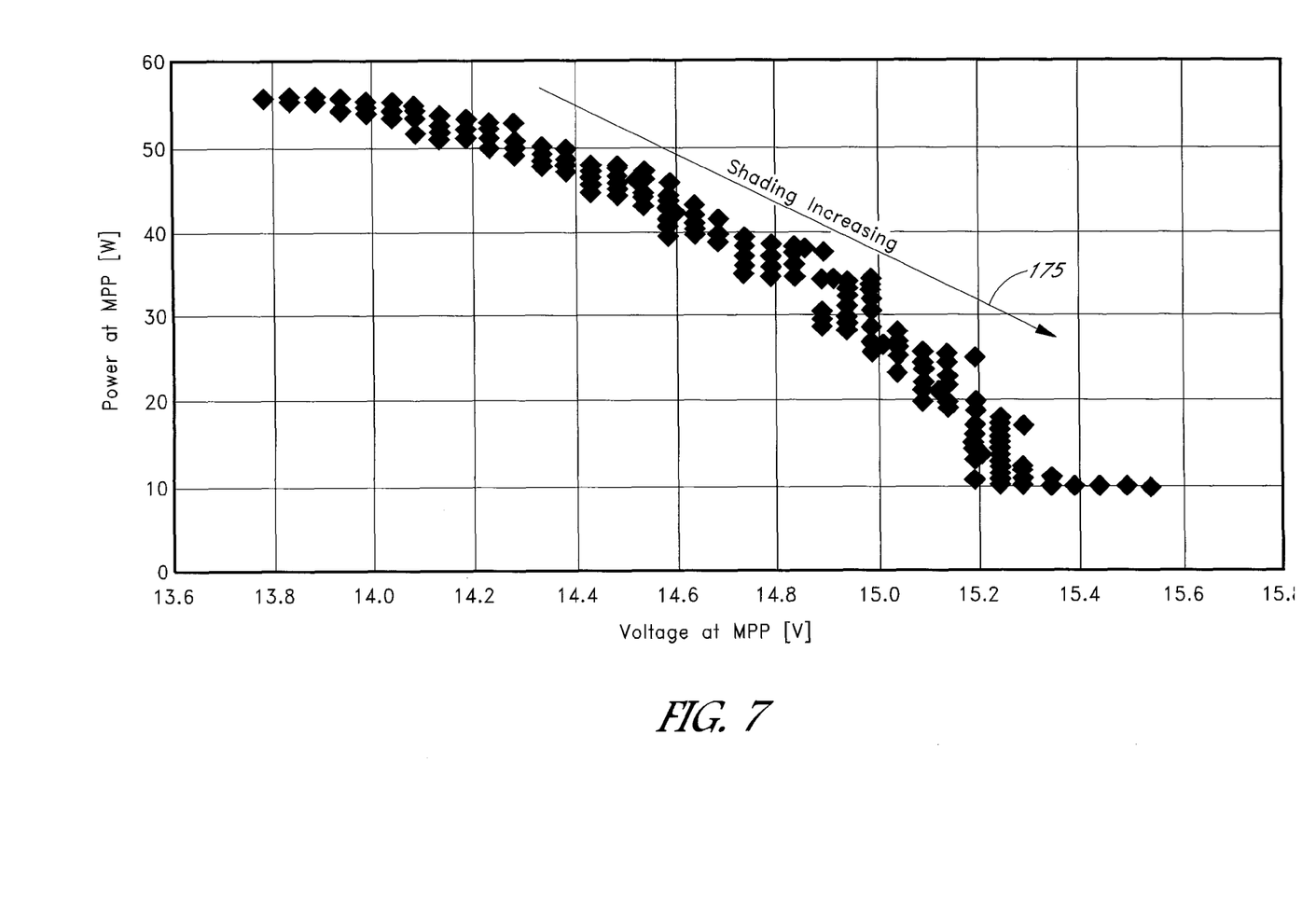
FIG. 7 shows power-voltage plots with increasing shading.

FIG. 7 shows a power vs. voltage plots at MPPs under conditions of increasing shading. As shown in FIG. 7, as shading increases (see arrow 175), the voltage at MPP increases but the corresponding power at the MPP decreases. This trend is indicative of shading of the solar cells 115.

When the MPP tracking module 122 detects one or more conditions indicative of shading of solar cells 115, the MPP tracking module modifies its MPP tracking behavior to prevent tracking of a local MPP (step 302 to step 303).

In normal MPP tracking, the MPP tracking module 122 increments or decrements the voltage of the solar cells 115 by a fixed step size to track the global MPP. The voltage that the MPP tracking method sets the solar cells 115 to track the global MPP is a setpoint voltage, which in this embodiment is the reference voltage Vref. The voltage, and accordingly the corresponding current, of the solar cells 115 is affected by the impedance presented to the solar cells 115, such as the input impedance of the inverter 120. The inverter 120 may change its input impedance to change the voltage of the solar cells 115. Once it determines the reference voltage Vref that tracks the global MPP, the MPP tracking module 122 sends the reference voltage Vref to the inverter 120 to command the inverter 120 to make the solar cells 115 generate a voltage at the same level as the reference voltage Vref.

In one embodiment, the MPP tracking module 122 modifies its normal MPP tracking behavior by increasing the step size for decrementing the reference voltage Vref (input 317). More particularly, when the MPP tracking module 122 detects a condition indicative of shading of the solar cells 115, the MPP tracking module 122 may increase the step size used in decrementing the reference voltage Vref. The larger decrement step size allows the MPP tracking module 122 to escape tracking of a local MPP that may occur when the solar cells 115 are or will be shaded. As a particular example, when the MPP tracking module 122 has a nominal step size of 10V, the MPP tracking module 122 may increase the nominal step size to 120V. The MPP tracking module 122 uses the increased decrement step size to calculate the next reference voltage Vref (step 303 to step 304).

The MPP tracking module 122 may modify its normal MPP tracking behavior by performing a conventional full I-V sweep to determine the reference voltage Vref (input 316). In normal MPP tracking, the MPP tracking module 122 determines the reference voltage Vref based on the previous reference voltage Vref. In particular, in normal MPP tracking, the MPP tracking module 122 increments or decrements the previous reference voltage Vref to determine the next reference voltage Vref. In the example of FIG. 5, the MPP tracking module 122 does not do so but instead scans through a progression of values of reference voltage Vref irrespective of the previous setpoint reference voltage Vref to identify voltage reference Vref values that correspond to global MPPs.

In the case where the MPP tracking module 122 detects one or more conditions indicative of shading of solar cells 115, the MPP tracking module 122 modifies its normal MPP tracking behavior to prevent tracking of local MPPs as previously described (step 303 to step 304). The MPP tracking module 122 then calculates the next reference voltage Vref in accordance with the modification and provides the next reference voltage Vref to the inverter circuits 121 of the inverter 120 (step 318). The inverter circuits 121 use the reference voltage Vref as a setpoint voltage and induce the solar cells 115 to generate an output voltage at the same level as the reference voltage Vref (step 319).

In the case where the MPP tracking module 122 does not detect a condition indicative of shading of solar cells 115, the MPP tracking module 122 performs normal MPP tracking without modification (step 302 to step 304), such as in accordance with conventional P&O method or IncC method, for example. The reference voltage Vref resulting from the normal MPP tracking without modification is then provided to the inverter circuits 121 of the inverter 120 as previously described.

Figure 8:
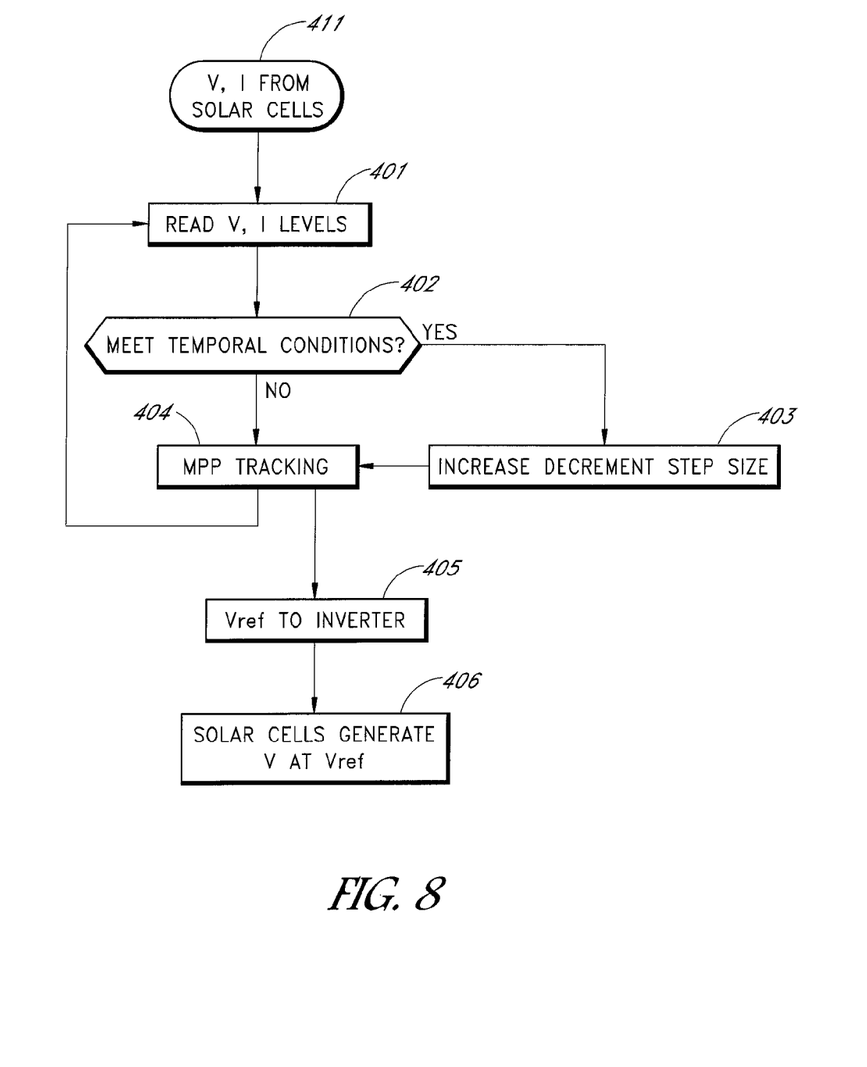
FIG. 8 shows a flow diagram of a method of operating a photovoltaic system in accordance with an embodiment of the present invention.

FIG. 8 shows a flow diagram of operating a photovoltaic system in accordance with an embodiment of the present invention. The method of FIG. 8 is explained using the components of the photovoltaic system 100 for illustration purposes only. Other components may also be employed without detracting from the merits of the present invention.

In the example of FIG. 8, the inverter 120 receives the voltage and current generated by the solar cells 115 (input 411). The MPP tracking module 122 reads the voltage and current levels of the solar cells 115 (step 401), e.g., from a voltage/current meter of the inverter 120. The MPP tracking module 122 may calculate the output power of the solar cells 115 from their voltage and current.

Before performing MPP tracking using the read voltage and current of the solar cells 115, the MPP tracking module 122 checks for one or more temporal conditions that signal when to increase the decrement step size for decrementing the reference voltage Vref or some other setpoint employed in MPP tracking (step 402). More particularly, the MPP tracking module 122 may increase the step size for decrementing the reference voltage Vref when it detects that a temporal condition has been met (step 402 to step 403).

In one embodiment, the temporal conditions include a predetermined interval or a random interval. For example, the temporal conditions may be based on the number of iterations through the MPP tracking method or based on a set number of seconds that has elapsed. The temporal conditions may also be at random times. When the predetermined or random interval is reached, the MPP tracking module 122 increases the step size for decrementing the reference voltage Vref during MPP tracking. For example, the decrement size of the reference voltage Vref may be increased 10 times or more (e.g., 10V increased to 120V in a 1000V system) upon reaching a predetermined or random time instance.

By increasing the decrement step size to be larger than the nominal decrement step size (i.e., the decrement step size used in normal MPP tracking) at certain instances of time, the MPP tracking module 122 will capture other global or local MPPs that have been introduced into the I-V curve. After several cycles of MPP tracking using the nominal decrement step size, the MPP tracking module 122 will converge to a lower maximum power voltage Vmp if it exists. The larger decrement step size for decrementing the reference voltage Vref may be set to capture voltage reduction due to a shaded group of solar cells 115 (e.g., at least ⅙ of the maximum power voltage Vmp if one group out of six groups is shaded).

Increasing the decrement step size may be repeated periodically or randomly to capture any new local MPPs that are introduced as shading of the solar cells 115 increases. The time difference between larger decrements of the reference voltage Vref may be set to balance the power gain from the global MPP and the power lost while the global MPP is being located. Regardless, this modification to the normal MPP tracking will eventually converge to the MPP with the lowest voltage.

Increasing the decrement step size may result in the reference voltage Vref dropping to a much lower voltage throughout the day even when a global MPP is being tracked correctly. To mitigate this lower reference voltage Vref, an additional condition may be included that checks the time of day as well. As a particular example, the temporal conditions may include a condition that prevents increasing of the decrement step size during certain hours of the day. It is to be noted that the maximum power voltage Vmp increases when the shading fraction decreases. However, the local MPPs will sequentially disappear, and the normal MPP tracking method will converge to the global MPP by using the larger decrement step size when a temporal condition is met.

When a temporal condition is met, the MPP tracking module 122 performs MPP tracking using the larger decrement step size (step 403 to step 404). For example, when the normal MPP tracking method indicates that the voltage of the solar cells 115 needs to be decremented to find a global MPP, the MPP tracking module 122 may use the larger decrement step size to decrement the voltage reference Vref provided to the inverter circuits 122 of the inverter 120 (step 405). The inverter circuits 121 use the reference voltage Vref as a setpoint voltage and induce the solar cells 115 to generate a voltage at the same level as the reference voltage Vref (step 406).

When no temporal condition is met, the MPP tracking module 122 performs normal MPP tracking using the nominal decrement step size (step 402 to step 404), such as in accordance with conventional P&O method or IncC method, for example. The reference voltage Vref calculated using the nominal decrement step size is then provided to the inverter circuits 121 of the inverter 120 as previously described.

A photovoltaic system and methods for operating same have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of operating a photovoltaic system, the method comprising:
    receiving a reading of a voltage and a current generated by a plurality of solar cells;
    detecting a condition that indicates shading of a group of solar cells in the plurality of solar cells by monitoring a trend of the voltage and output power of the plurality of solar cells and detecting shading of the group of solar cells when the voltage of the plurality of solar cells increases while the output power of the plurality of solar cells decreases;
    in response to detecting the condition that indicates shading of the group of solar cells, modifying maximum power point tracking of the photovoltaic system to generate a setpoint voltage; and
    the plurality of solar cells generating the voltage in accordance with the setpoint voltage.

2. The method of claim 1 wherein detecting the condition that indicates shading of the group of solar cells comprises:
    receiving a position information from a solar tracker that positions the plurality of solar cells to face towards solar illumination.

3. The method of claim 2 wherein the position information comprises rotational angle of a motor configured to rotate to position the plurality of solar cells.

4. The method of claim 3 wherein the rotational angle is derived from a motor setpoint received from a controller configured to control rotation of the motor.

5. The method of claim 1 wherein detecting the condition that indicates shading of the group of solar cells comprises:
    detecting a particular time of day when maximum power point tracking of a local maximum occurs.

6. The method of claim 1 wherein detecting the condition that indicates shading of the group of solar cells comprises:
    detecting a solar position when maximum power point tracking of a local maximum occurs.

7. The method of claim 1 wherein detecting the condition that indicates shading of the group of solar cells comprises:
    detecting when a photovoltaic module comprising the group of solar cells is shaded by another photovoltaic module comprising another group of solar cells in the plurality of solar cells.

8. The method of claim 1 wherein modifying the maximum power point tracking of the photovoltaic system comprises:
    increasing a step size used to decrement the setpoint voltage.

9. The method of claim 1 wherein modifying the maximum power point tracking of the photovoltaic system comprises:
    performing a current-voltage (I-V) curve sweep using a sequence of different values of the setpoint voltage.

10. The method of claim 1 wherein the setpoint voltage is a reference voltage of an inverter configured to convert direct current (DC) generated by the plurality of solar cells to alternating current (AC) and the inverter induces the plurality of solar cells to generate the voltage at a same level as the reference voltage.

11. A photovoltaic system comprising:
    a plurality of solar cells;
    a solar tracker configured to position a first photovoltaic module comprising a first group of solar cells in a plurality of solar cells, the solar tracker including a motor for adjusting the position of the first photovoltaic module;
    an inverter configured to receive a voltage and a current of the plurality of solar cells; and
    a maximum power point tracking module configured to perform maximum power point tracking and to detect shading of the first photovoltaic module by monitoring a trend of the voltage and output power of the plurality of solar cells and detecting shading of the first photovoltaic module when the voltage of the plurality of solar cells increases while the output power of the plurality of solar cells decreases.

12. The photovoltaic system of claim 11 wherein the maximum power point tracking module is configured to receive a rotational angle of the motor and to detect when the first photovoltaic module shades a second photovoltaic module based on the rotational angle of the motor.

13. The photovoltaic system of claim 12 wherein the maximum power point tracking module derives the rotational angle of the motor from a motor setpoint received from a controller configured to control rotation of the motor.

14. The photovoltaic system of claim 11 wherein the maximum power point tracking module is configured to generate a setpoint of the inverter based on the detection of the first photovoltaic module shading the second photovoltaic module.

15. The photovoltaic system of claim 14 wherein the setpoint of the inverter comprises a reference voltage, and the inverter is configured to induce the plurality of solar cells to generate the voltage in accordance with the reference voltage.

16. A method of operating a photovoltaic system, the method comprising:
    performing maximum power point tracking to decrement a voltage setpoint by a first decrement step size;
    a plurality of solar cells generating a voltage in accordance with the voltage setpoint;
    increasing the first decrement step size to a second decrement step size upon occurrence of a time instance, the second decrement step size being larger than the first decrement step size;
    performing maximum power point tracking to decrement the voltage setpoint by the second decrement step size; and
    after the voltage setpoint is decremented by the second step size, the plurality of solar cells generating the voltage in accordance with the voltage setpoint.

17. The method of claim 16 wherein the voltage setpoint is a reference voltage of an inverter configured to induce the plurality of solar cells to generate the voltage.

18. The method of claim 16 wherein the time instance is predetermined.

19. The method of claim 16 wherein the time instance is random.

* * * * *